(No Model.)
I. TOOMER.
MACHINE FOR STRAIGHTENING AND EXPANDING SAWS.
No. 510,210. Patented Dec. 5, 1893.
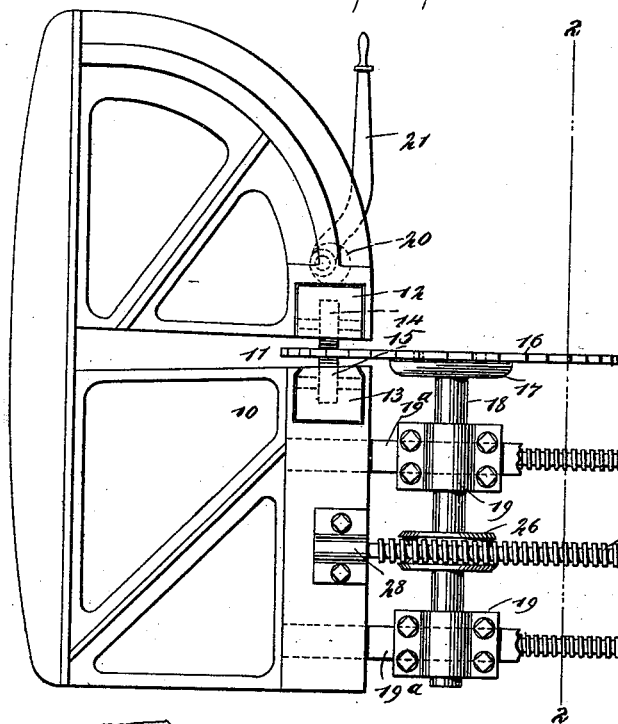
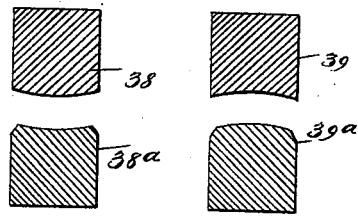
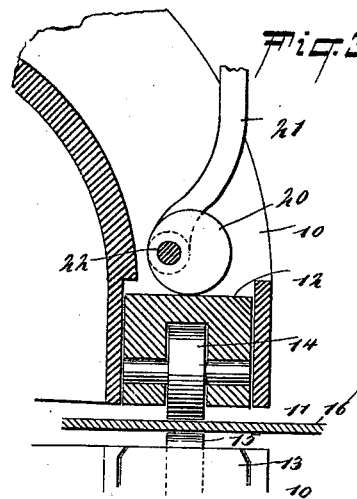
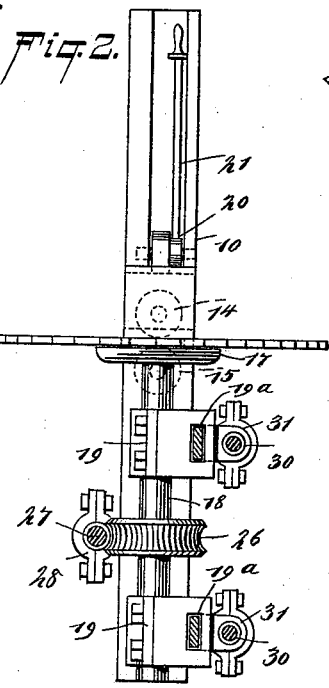
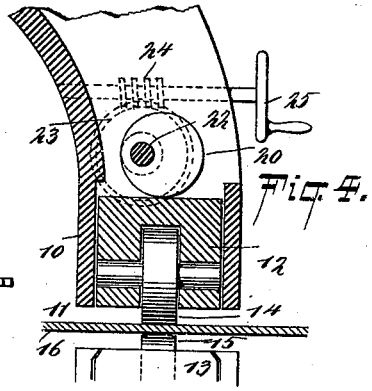
WITNESSES:
William Goebel
C. Sedgwick
INVENTOR
I. Toomer
BY Munn & Co
ATTORNEYS.
THE NATIONAL LITHOGRAPHING COMPANY,
WASHINGTON, D. C.

UNITED STATES PATENT OFFICE.

ISAAC TOOMER, OF WESTLAKE, LOUISIANA.

MACHINE FOR STRAIGHTENING AND EXPANDING SAWS.

SPECIFICATION forming part of Letters Patent No. 510,210, dated December 5, 1893.

Application filed May 24, 1893. Serial No. 475,330. (No model.)

*To all whom it may concern:*

Be it known that I, ISAAC TOOMER, of Westlake, in the parish of Calcasieu and State of Louisiana, have invented a new and Improved Machine for Straightening and Expanding Saws, of which the following is a full, clear, and exact description.

My invention relates to improvements in that class of machines which are used for straightening saws, expanding the same, and leveling them, and is intended to apply to both band and circular saws.

The object of my invention is to produce a simple machine of the class named, which is strong, durable, cheap and easily operated, which may be conveniently applied to a saw, which is adapted to roll the surface of the saw so as to make it perfectly level, which is adapted to strike every part of the saw, and which, while adapted to use rollers, is also provided with compressing blocks which may be used for leveling excessively high humps or bunches on the saw.

To these ends my invention consists of certain features of construction and combinations of parts, as will be hereinafter described and claimed.

Reference is to be had to the accompanying drawings forming a part of this specification, in which similar figures of reference indicate corresponding parts in all the views.

Figure 1 is a broken side elevation of the machine embodying my invention, showing the application of a saw thereto. Fig. 2 is a vertical cross section on the line 2—2 in Fig. 1. Fig. 3 is an enlarged detail sectional plan of the leveling rollers as applied to a saw and of the mechanism for adjusting or forcing down the upper roller. Fig. 4 is a similar view, showing a modified means of forcing down the upper leveling roller. Fig. 5 is a detail sectional view illustrating two forms of blocks which may be substituted for the rollers, and Fig. 6 is a similar view illustrating two other forms of blocks which may be used for leveling humps on the saw.

The machine is provided with a suitable substantial frame 10, which is provided with a transverse slot or opening 11, through which the saw to be operated upon may pass, and in the front side of the machine, above and below the slot 11, are bearing blocks 12 and 13, the upper of which is vertically movable, and in these blocks are journaled the leveling rollers 14 and 15, which are arranged opposite each other so that their faces will register, and they project into the slot and beyond the adjacent faces of the bearing blocks so that they may press firmly upon a saw which is passed between them.

If a band saw is to be leveled, it may be rolled lengthwise between the rollers, and if a circular saw 16 is to be leveled and expanded or straightened, it is held to revolve through the slot between the rollers and is fastened in any convenient way to a head 17, on one end of a mandrel 18, this head being arranged with its upper surface level with the top of the lower roller 15. The mandrel 18 turns in suitable boxes 19, which slide on parallel and horizontal supports $19^a$, and mechanism, to be hereinafter described, is adapted to move these boxes 19 and the mandrel which they carry, toward and away from the frame 10, and thus nearly every portion of the saw is brought between the rollers, and as the several parts travel between the rollers 14 and 15, the pressure of said rollers upon the saw causes the same to be leveled, straightened and expanded. The upper bearing block 12 is forced downward while the saw is being operated upon, and in order that the saw may be sufficiently compressed, either the mechanism shown in Fig. 3 or Fig. 4 may be used for this purpose, or other equivalent mechanism may be substituted. As shown in Fig. 3, an eccentric 20 rides upon the block 12 and is journaled in the frame 10 above the block, this eccentric having an upwardly extending lever 21 which may be grasped and turned down so as to force the eccentric upon the block 12 and this jams the block downward so as to bring the roller 14 forcibly upon the saw 16.

Instead of the lever mechanism just described for working the eccentric, the shaft 22 of the eccentric may be provided with a worm wheel 23, as shown by dotted lines in Fig. 4, and this worm wheel meshes with a screw shaft 24 which is journaled in the frame 10 and is provided at one end with a hand wheel 25; and it will be seen that by turning the hand wheel the gear mechanism will cause the eccentric to be revolved so that it may be forced downward upon the block 12 when desired.

The saw is constantly revolved while it is being operated upon, and the revolution of the mandrel 18 which carries the saw is effected preferably by the worm wheel 26 on the mandrel and the screw shaft 27 which engages the worm wheel and which is journaled in boxes 28 on the frame 10 and on a suitable support 29, the shaft having at one end a cone pulley 29$^a$ or equivalent driving gear which enables the speed of the shaft to be shifted. The forward and backward movement of the mandrel 18 is effected by the screw shafts 30, which are likewise journaled in the support 29 and on the main frame, and the screw shafts fit nuts 31 on the backs of the boxes 19, as shown clearly in Fig. 2, so that when the shafts are revolved, the boxes will be carried by them and the direction in which the boxes move will, of course, be governed by the direction in which the screw shafts turn.

The screw shafts 30 have at their outer ends beveled pinions 32, which mesh with similar pinions 33 on a shaft 34 which is arranged at right angles to the screw shafts, and in any suitable support, the shaft 34 having at one end a friction cone 35 which is adapted to engage with the cones 36 on a shaft 37 which is arranged parallel with the shafts 30, and this shaft 37 may be moved so as to bring either of the cones 36 into engagement with the cone 35 and thus control the direction of the screw shafts and of the saw mandrel.

I have not shown in detail the mechanism for shifting the cones 36 or the supports for the cone shaft and the shaft 34, as it will be understood that any ordinary shifting gear may be used for changing the direction of the screw shafts 30, and I do not claim such shifting gear in detail nor limit my invention to the use of the gear shown.

The operation of leveling the saw will be understood from the description of the machine; that is to say, the saw 16 is carried upon the head 17 of the mandrel, is constantly revolved by the worm gear described, and turns between the leveling rollers 14 and 15, the former of which is forced downward upon the saw in the manner above described. The saw is reciprocated by the screw shafts 30, and consequently the rollers are brought to bear on successive concentric circular portions of the saw, and every portion of the saw is thus leveled and expanded.

Instead of the bearing blocks and rollers described, blocks 38 and 38$^a$ or 39 and 39$^a$ may be used, these blocks being especially adapted for leveling unusually large humps or inequalities on the saw. The block 38$^a$ may be substituted for the block 13, and the block 38 for the block 12, and by reference to Fig. 5 it will be seen that the top face of the block 38$^a$ is concave while the lower face of block 38 is convex, and consequently these blocks are adapted to be used when the hump is on the top of the saw, but if it is on the other side, the blocks 39 and 39$^a$ may be used, which are similar to the blocks 38 and 38$^a$, except that the block 39 is concave and the block 39$^a$ convex.

Having thus described my invention, I claim as new and desire to secure by Letters Patent—

A machine of the kind described, comprising a pair of oppositely arranged bearing blocks, rollers journaled in the blocks, mechanism for forcing the rollers together, and a revoluble saw mandrel adapted to carry the saw and revolve it between the rollers, the mandrel being slidable to and from the rollers, a worm wheel mounted on the mandrel, the screw shaft 27 engaging said wheel, the screw shafts 30 working in boxes 19 on the mandrel, and means for rotating said screw shafts, substantially as described.

ISAAC TOOMER.

Witnesses:
DAVID REIMS,
A. J. REID.